T. W. BRYANT.
SKATE.
No. 11,217. Reissued Jan. 19, 1892.
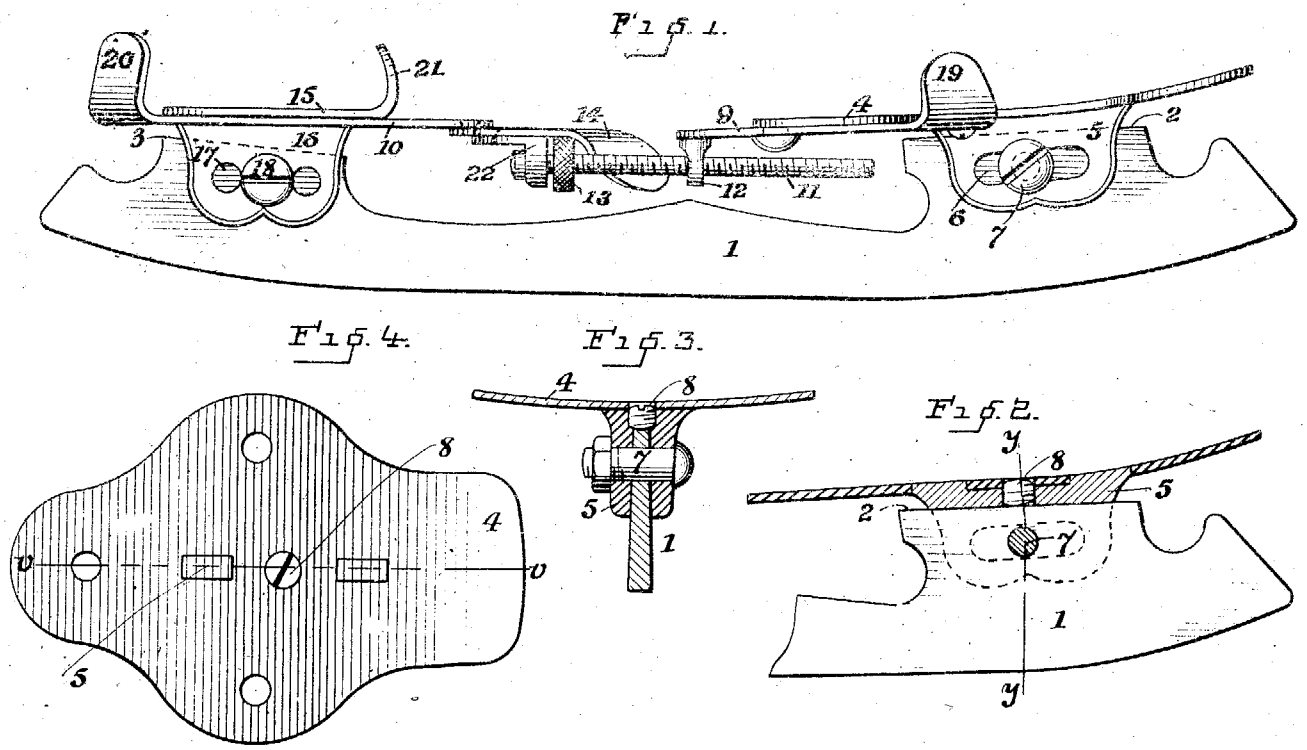
WITNESSES.
C. M. Newman
A. J. Tanner
INVENTOR.
Thomas W. Bryant
by his attorney
O. H. Hubbard

UNITED STATES PATENT OFFICE.

THOMAS W. BRYANT, OF TORRINGTON, CONNECTICUT.

SKATE

SPECIFICATION forming part of Reissued Letters Patent No. 11,217, dated January 19, 1892.

Original No. 464,312, dated December 1, 1891. Application for reissue filed December 18, 1891. Serial No. 415,804.

*To all whom it may concern:*

Be it known that I, THOMAS W. BRYANT, a citizen of the United States, residing at Torrington, in the county of Litchfield and State of Connecticut, have invented certain new and useful Improvements in Skates; and I do hereby declare the following to be a full, clear, and exact description of the invention, such as will enable others skilled in the art to which it appertains to make and use the same.

This invention relates to certain novel and useful improvements in skates, and has for its object to improve upon the construction of previous skates in the manner presently to be explained, and to furnish a skate which shall be provided with a simple, neat, and effective fastening mechanism, and which at the same time shall be extensible to fit shoes of different sizes; and with these ends in view my invention consists in the details of construction and combinations of elements hereinafter fully explained, and then recited in the claims.

In order that those skilled in the art to which my invention appertains may fully understand its construction and method of operation, I will describe these in detail, reference being had to the accompanying drawings, which form a part of this specification, and in which—

Figure 1 is a side elevation of my improved skate. Fig. 2 is a detail longitudinal section on the line *v v* of Fig. 4. Fig. 3 is a transverse section on the line *y y* of Fig. 2. Fig. 4 is a plan view of the sole-plate.

The same numerals denote the same parts in all the figures.

The blade 1 may be of any desired shape or configuration, so as to provide either a speed-skate or a skate suited to figure-skating. Said blade has, however, as shown at 2 and 3, upward projections whose top edges are straight lines. The sole-plate 4, which is shown in plan view at Fig. 4, has secured thereto a bifurcated hanger 5, which rests astride the projection 2 from the runner. Each of the two cheeks of this hanger is provided with a longitudinal slot 6. A screw or bolt 7 passes through a hole in the runner and also through the slots in the hanger.

8 is a screw tapped through the center of the sole-plate and the body of the hanger, its point engaging against the flat top of the projection 2, which may be slightly roughened.

9 are curved toe-clamp levers, which slide in or upon the sole-plate and terminate in the upturned ends 19, and 10 is the heel-clamp slide having the clamping-jaws 20 for co-operation with jaw 21 on the heel-plate, and the sole and heel clamps are connected by means of a long adjustment-screw 11, which passes through a lug 12 on the levers 9, and a lug 22, connected to the heel-slide, and is furnished with a thumb-nut 13.

14 is the eccentrically-pivoted operating-lever whereby the toe-clamps are drawn inward and the heel-slide drawn forward.

15 is the heel-plate, beneath which the clamp 10 is so secured as to slide longitudinally. This heel-plate is provided with a hanger 16, which may be slotted in the same manner as the hanger 5 and adapted to be held and adjusted as heretofore explained with reference to the sole-plate; but as the heel adjustment is less often changed than that of the sole-plate I find it convenient to provide the hanger with two or more holes 17, through which and a hole in the projection 3 a bolt 18 is passed, as shown at Fig. 1.

The operation of my invention is as follows: To extend or shorten the skate by means of the sole-plate adjustment, the screw 8 is first loosened with a screw-driver, whereupon the slotted hanger is free to be moved lengthwise upon the projection 2, guided by the screw or bolt 7. The sliding of the sole-plate is effected by means of the screw 11, which also controls the position and capacity of the parts forming the clamping devices; but the sole-plate may be moved by hand where the width of the sole and the size of the heel-clamps do not require to be changed. When the skate is properly adjusted as to length, the screw 8 is set down firmly against the top edge of the projection 2, so as to hold the sole-plate as against movement either forward or backward on the blade. When an extra long or extra short shoe is to be fitted, it may become necessary to employ the heel adjustment in addition to that of the sole-plate. If the heel-plate is provided with the same device as the sole-plate, the adjustment will be effected in the same way; but if the holes and screw shown at Fig. 1 are employed said bolt or screw is first removed, the heel-plate moved as required, and then the fastening replaced. It will be thus seen that the screw 11 has a double function—namely, when the foot-plates are fast upon the blade the operation of the screw is to move the clamping-levers 9 and heel-plate 10 so as to vary the clamping capacity without changing the length of the skate; but when the sole-plate is loose the operation of the screw will slide it relative to the blade, and thus lengthen the skate without altering the capacity of the clamps. If the skate is to be adjusted to fit a longer and wider shoe, the sole-plate is loosened and pushed outward by the screw, so as to lengthen the foot-bearing, and is then secured by the screw 8. Then to enlarge the capacity of the clamps the screw 11 is further manipulated, so as to push the levers 9 and heel-slide 10 apart, which enlarges the scope of the clamping-jaws.

The set-screw 8 forms an important part of my invention in connection with the slotted hanger, since it furnishes a convenient and positive means for preventing accidental displacement between the sole-plate and the blade. It might be said that such a result could be accomplished by means of the screw 7; but where hangers of cast-iron are employed the metal has not the spring quality to permit of its two parts being drawn together, and where hangers of malleable iron are employed they acquire, when drawn together to hold the runner, a "set" against the blade, which interferes with the easy sliding of the parts. Furthermore, the screw 7 is exposed to moisture, and when slightly rusted may become incapable of operation with an ordinary screw-driver. The set-screw 8 is directly in the center of the sole-plate. It is not exposed to moisture from the ice, and as it is covered by the foot cannot be accidentally loosened while in use.

It is now usual for dealers to carry in stock about eight lengths of skates. By means of the adjustment herein described two sizes of skates will be ample to provide for all lengths of shoes fitted by the eight sizes above referred to.

In this my invention I do not wish to be confined to the exact details of construction herein shown and described, since these may be modified in various respects. For instance, while I prefer for a number of reasons to slot the hanger, it will be understood that a similar adjustment admitting of the use of the set-screw 8 might be obtained by slotting the projection 2 and passing the fastening-screw through close-fitting holes in the hanger.

I claim—

1. In a skate, the combination, with the blade, of the sole-plate, the hanger depending therefrom and having a sliding engagement with the blade, and a set-screw extending downward through the sole-plate and engaging the blade, substantially as set forth.

2. In a skate, the sole-plate having the bifurcated and slotted hanger 5 and the fastening-screw 8, extending downward through said plate to engage the blade, in combination with the screw or bolt 7, forming a guide for the hanger, substantially as described.

3. The combination, with the heel-plate and its clamp, of the sole-plate provided with the clamping-levers 9, the slotted hanger 5, the screws 7 and 8, and the longitudinally-extended adjusting-screw 11, all arranged as described, and for the purpose set forth.

4. In a skate, a blade, in combination with a sole-plate and a heel-plate, each having clamps, one or both plates movable along the blade, means, as described, for effecting rigid engagement between said plates and blade, and a screw connecting the sole and heel-clamps, whereby when the plates are fast the capacity of the clamps may be varied and when one or both of the plates are loose the size of the skate may be adjusted.

5. In a skate, the blade, as described, in combination with the sole-plate and the heel-plate, the former adapted to have movement along the blade and provided with a clamping-screw for rigidly securing it thereon, the levers 9, having jaws 19, the heel-slide 10, having jaws 20, co-operating with a jaw 21 on the heel-plate, and the long adjusting-screw 11, having a thumb-nut and connecting the heel-slide and the clamping-levers 9, all of the elements aforesaid constructed and adapted to operate substantially in the manner and for the purposes hereinbefore set forth.

THOS. W. BRYANT.

Witnesses:
LEWIS M. JONES,
CHAS. L. MCNEEL.